(No Model.)
L. BLOHM.
MOLD FOR FORMING ORNAMENTAL MOLDINGS.
No. 283,560. Patented Aug. 21, 1883.
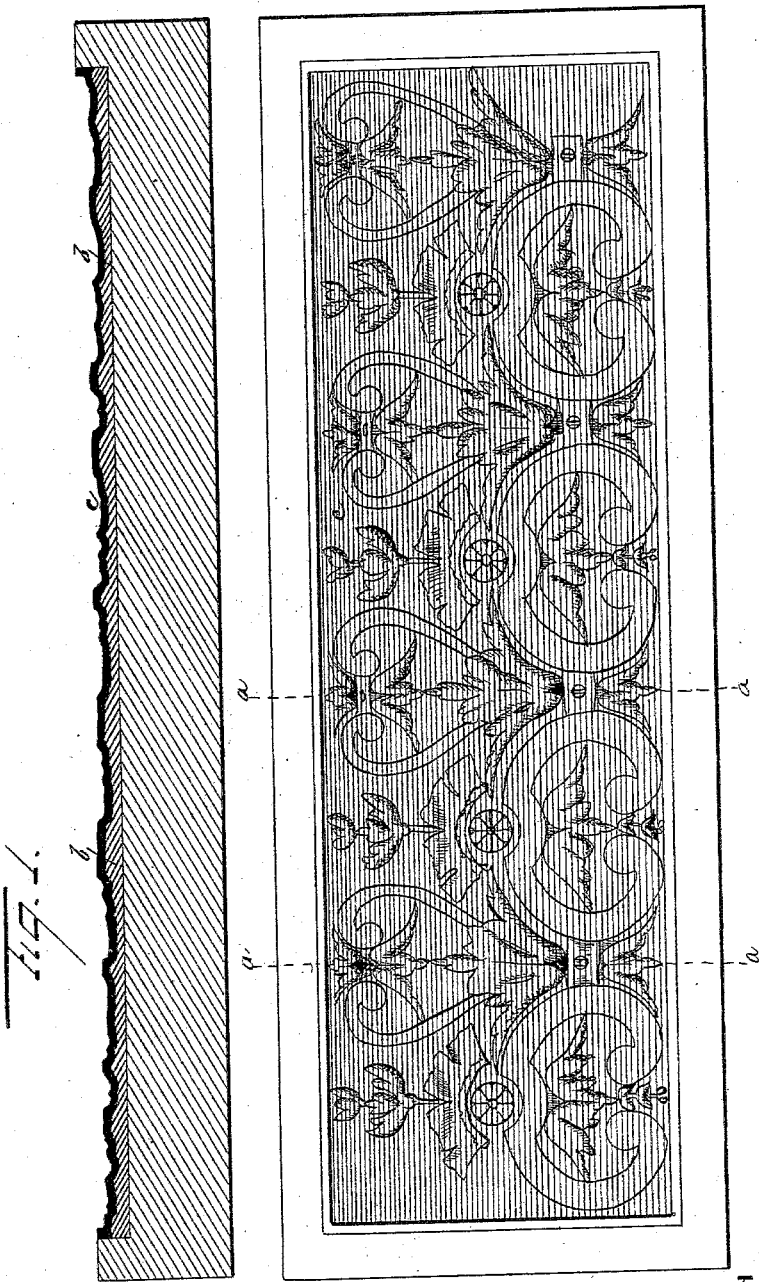

UNITED STATES PATENT OFFICE.

LUDWIG BLOHM, OF CHICAGO, ILLINOIS.

MOLD FOR FORMING ORNAMENTAL MOLDINGS.

SPECIFICATION forming part of Letters Patent No. 283,560, dated August 21, 1883.

Application filed April 6, 1883. (No model.)

*To all whom it may concern:*

Be it known that I, LUDWIG BLOHM, a citizen of the United States, residing at Chicago, in the county of Cook and State of Illinois, have invented certain new and useful Improvements in Molds for Forming Ornamental Moldings, of which the following is a specification, to wit:

This invention relates to molds for forming ornamental moldings; and it consists in the process of constructing the molds, substantially as will be hereinafter more fully set forth.

In order to enable others skilled in the art to which my invention appertains to make and use the same, I will now proceed to describe its construction and operation, referring to the annexed drawings, in which—

Figure 1 is a central longitudinal section of one of my molds, and Fig. 2 a plan view of the same.

As now made, it is usual to construct molds of wood about fourteen inches in length, and in this space the design usually repeats itself several times. The objection to this method is the time necessary to accurately carve these repetitions of the design, the cost of employing skilled workmen for the construction of the whole mold, and the care and time necessary in forming or carving the molds in negative form in order to show a positive when molded. This I remedy in the following manner, viz: Only so much of the design is carved in wood or other suitable material as forms one complete portion of the repeated design in the mold—as, for instance, the part inclosed by the dotted lines $a\,a$ in the drawings. This is much more rapidly and accurately done because carved in relief, as it will appear on the finished molding. This section is then pressed in wax or other suitable plastic material, and the impressions are repeated in order to repeat the design for any length of mold required. The form so made is placed in an electric bath, and its face covered by a deposit of any suitable metal—such as copper—which is evenly and thinly deposited over the whole face of the form, and conforms exactly to the design impressed upon it. When this deposit has formed a sheet, $c$, of sufficient thickness, it is removed from the bath, and the plastic material in which the form was impressed is removed by heat or other means, and a backing of lead or similar soft metal, $b$, run in, which forms with the copper face a solid-metal mold, by which the ornament is formed for use upon the moldings, which will be much more accurate than where the reproductions of the design are made by carving, is much easier and quicker made, and forms a more lasting mold, while leaving the original carving unhurt for future use should a new mold be desired.

Having thus fully described my invention, what I claim as new, and desire to secure by Letters Patent, is—

1. The process herein described for making molds for plastic ornaments, consisting in first carving one complete section of the design; second, in pressing this section in plastic material with any desired number of repetitions; third, in forming a metal deposit upon the face of such plastic mold in an electric bath, and, finally, in separating the metallic mold thus formed from the plastic material, and providing it with a soft-metal backing, substantially as and for the purpose herein set forth.

2. A mold for forming ornamental moldings, consisting of a thin sheet of copper or equivalent metal, in which the desired ornamental configurations are formed, in combination with a soft-metal backing or base, substantially as shown and described.

In testimony whereof I affix my signature in presence of two witnesses.

LUDWIG BLOHM.

Witnesses:
J. E. STEVENSON,
FRANK BERGER.